United States Patent [19]
Miyoshi et al.

[11] 3,843,903
[45] Oct. 22, 1974

[54] HIGH VOLTAGE GENERATOR

[75] Inventors: Keisuke Miyoshi, Katano; Naoki Shibano, Sakai, both of Japan

[73] Assignee: Matsushita Electric Industrial Co. Ltd., Osaka, Japan

[22] Filed: June 4, 1973

[21] Appl. No.: 366,513

[30] Foreign Application Priority Data
- June 22, 1972 Japan.............................. 47-62678
- June 22, 1972 Japan.............................. 47-62679
- June 22, 1972 Japan.............................. 47-62680

[52] U.S. Cl................. 315/29, 178/7.5 R, 178/7.8, 178/DIG. 11
[51] Int. Cl. ........................................ H01j 29/70
[58] Field of Search.......... 321/2; 315/1, 27 TD, 29, 315/30; 178/7.5 R, 7.8, DIG. 11

[56] References Cited
UNITED STATES PATENTS

| | | | |
|---|---|---|---|
| 2,879,447 | 3/1959 | Preisig | 315/29 |
| 3,049,640 | 8/1962 | Bruch | 321/2 HF |
| 3,112,425 | 11/1963 | Theisen | 315/30 |

*Primary Examiner*—Gerald Goldberg
*Attorney, Agent, or Firm*—Stevens, Davis, Miller & Mosher

[57] ABSTRACT

A high voltage generator is provided in which a rectifier is connected with the same polarity to each end of the secondary winding of a transformer, e.g., a flyback transformer in such a manner that the other end of one of the rectifiers is connected to a reference potential point and a high DC voltage is produced at the other end of the other rectifier, and moreover, if desired, a moderately high DC voltage is derived from a neutral point for the alternating current which is formed in the secondary winding.

9 Claims, 13 Drawing Figures

180
HIGH VOLTAGE GENERATOR

The present invention relates to a high voltage generator which is used to supply a high DC voltage, for example, to the cathode ray tube of a television receiver, and more particularly to a high voltage generator which generates a DC voltage higher than heretofore obtainable, which generates a high voltage more stably and which also generates a moderately high DC voltage in a simple manner.

Generally, television receivers require the generation of a high DC voltage of the order of 10 to 30 kv. which is applied to the anode of the cathode ray tube and of a moderately high DC voltage of the order of one fourth of the former voltage which is applied to the focusing electrode of the cathode ray tube. In standard television receivers, such high DC voltage and moderately high DC voltage involve currents of small values and thus the flyback pulses produced in the horizontal deflection circuit during the flyback period are stepped up by the flyback transformer and then rectified by the rectifier to provide the required voltages. However, since the voltage used with such a high voltage generator is extremely high and moreover the voltage is a pulse signal, there are still many problems which must be solved to achieve operation with improved efficiency, improved insulation characteristics, operation with improved stability and so on.

One form of known high voltage generator for television receivers will be explained first. FIGS. 1a and 1b of the accompanying drawings illustrate typical circuit diagrams of this high voltage generator. In FIG. 1a, numeral 1 designates a horizontal deflection circuit including a horizontal deflection oscillation output circuit and horizontal deflection coils for enabling the horizontal scanning of the electron beam in a cathode ray tube 2. Numeral 3 designates a flyback transformer for stepping up the flyback pulse generated by the horizontal deflection circuit 1, 4 a rectifier for rectifying the high AC voltage generated by the flyback transformer 3 and supplying it to the anode of the cathode ray tube 2 as the required high DC voltage. FIG. 1b is an equivalent circuit for the high AC voltage generating portion of such high voltage generator. In FIG. 1b, numeral 31L designates the total inductance on the side of a primary winding 31 of the flyback transformer 3, 31C the total resonance capacitance on the side of the primary winding 31, 32L the leakage inductance on the secondary winding side which has been transferred to the primary side, 32C the total capacitance on the side of the secondary winding 32 which has been transferred to the primary side assuming that the total capacitance including the stray capacitance, etc. were concentrated on a coupler 33. In this case, if $C_o$ represents the total capacitance on the secondary side, $n_1$ the number of turns in the primary winding 31 of the flyback transformer 3, $n_2$ the number of turns in the secondary winding 32, then the value $C_2$ of the capacitance 32C transferred to the primary side is given as $$C_2 = (n_2/n_1)^2 C_o$$

With the high voltage generator arranged as described above, in order to prevent variation of the anode current (beam current) for the cathode ray tube 2 from changing the value of the high DC voltage, that is, in order to reduce the substantial internal impedance of the high voltage generator, a method has been employed in which the secondary side resonant frequency determined by the inductance 32L and the capacitance 32C is selected to have a frequency which is an odd multiple of the primary side resonant frequency determined by the inductance 31L and the capacitance 31C. With the prior art high voltage generators of the type described, the value $C_2$ of the (transferred) capacitance 32C on the secondary side is so great that the maximum frequency that the secondary side resonant frequency can assume is limited to the third harmonic and consequently the resultant high AC voltage has a waveform with a peak which causes the peak pulse amplitude to appear at the central portion thereof with a considerable increase in the impedance value. As a result, variation of the DC voltage due to variation of the anode current for the cathode ray tube 2 cannot be reduced beyond a certain limit and the stability attained is not satisfactory. Further, when it is necessary to generate a moderately high DC voltage for the focusing electrode in a bipotential cathode ray tube, it is customary to supply the required moderately high DC voltage by dividing the high DC voltage with a very high resistance resistor. However, this method is disadvantageous in that since the high DC voltage itself has poor stability as previously mentioned and the high voltage generator has a high impedance, even a little leakage current may cause defocusing.

FIGS. 2a and 2b show customary methods of generating the required moderately high DC voltage for the focusing electrode. In FIG. 2a, a center tap 34 is provided in a secondary winding 32 of a flyback transformer 3 so that the generated moderately high AC voltage is rectified by a diode 51, smoothed out by a capacitor 52 and then adjusted by a resistor 53 to supply the required voltage to the focusing electrode, while in FIG. 2b a flyback transformer 3 is provided with a secondary winding 35 for generating a moderately high AC voltage which is rectified by a rectifier 51, smoothed out by a capacitor 52 and adjusted by a resistor 53 to thereby supply the required voltage to the focusing electrode. However, these customary methods have a disadvantage of additionally requiring the rectifier 51.

It is therefore an object of the present invention to provide a high voltage generator in which the capacitance on the secondary side of a flyback transformer is substantially reduced to generate a high voltage output and which is capable of effecting the tuning of the flyback transformer to higher order of harmonics with ease and operating with an improved efficiency.

It is another object of the present invention to provide a high voltage generator in which the flyback transformer and the like can be simply insulated for the alternating current and which is also capable of generating a high voltage output with rectifiers having a low withstanding voltage.

It is still another object of the present invention to provide a high voltage generator capable of easily generating, in addition to the required high DC voltage, a moderately high DC voltage to be supplied, for example, to the focusing electrode of a cathode ray tube and easily adjusting the value of the moderately high DC voltage.

In accordance with the present invention, there is thus provided a high voltage generator which is so designed that the capacitance on the secondary side of a flyback transformer is reduced to generate a high AC voltage, that the flyback transformer can be easily tuned to a higher order of harmonic to secure optimum performance and operation with improved efficiency, that the insulation for the alternating current can be simplified, that rectifiers with lower withstanding voltages than heretofore required can be used, that a moderately high DC voltage can be very easily supplied, for instance, to the focusing electrode of the cathode ray tube.

Therefore, the invention consists primarily in a high voltage generator comprising a transformer having a secondary winding, a first rectifier having its one end connected to one end of the secondary winding and the other end connected to a reference potential point, and a second rectifier connected in the same polarity as the first rectifier and having one end thereof connected to the other end of the secondary winding and having the other end connected to an output terminal for DC voltage.

Above and other objects, features and advantages of the present invention will become readily apparent from the following detailed description when taken in conjunction with the accompanying drawings, in which.

Figure 1A:
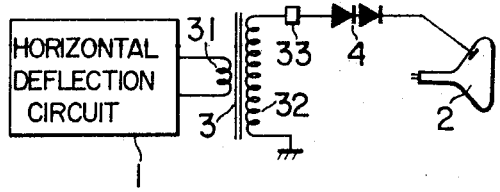
FIGS. 1a and 1b are respectively a circuit diagram of a prior art high voltage generator and its equivalent circuit diagram.
Figure 1B:
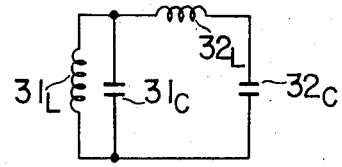
Figure 2A:
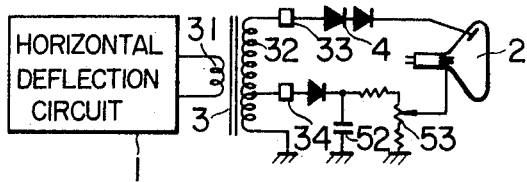
FIGS. 2a and 2b are respectively a circuit diagram of another prior art high voltage generator and its equivalent circuit diagram.
Figure 2B:
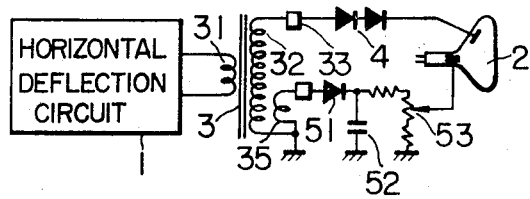
Figure 3A:
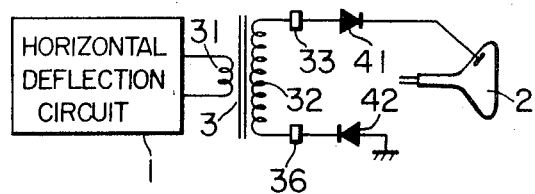
FIGS. 3a, 3b and 3c are respectively a circuit diagram, equivalent circuit diagram thereof and further-modefied circuit diagram of a high voltage generator according to an embodiment of this invention.
Figure 3B:
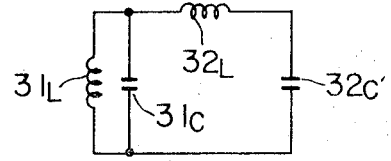

The present invention will now be explained in greater detail referring first to FIG. 3a showing a circuit diagram of the high voltage generator according to the first embodiment of the invention and FIG. 3b showing an equivalent circuit diagram thereof. In this embodiment, rectifiers 41 and 42 are connected with the same polarity to the ends of a secondary winding 32 of a flyback transformer 3, and the anode of the rectifier 42 is connected to a reference potential point (in this case — ground). That is, a direct current flowing through the secondary winding 32 of the transformer will follow a path from ground, through diode 42 from its anode to cathode, coupler 36, winding 32, coupler 33, through diode 41 from its anode to cathode and to the anode of cathode ray tube 2. A high DC voltage is produced at the cathode of the other rectifier 41 and then supplied to the anode of a cathode ray tube 2. With this arrangement, the secondary winding 32 of the flyback transformer 3 is floated from ground so that if the flyback transformer 3 is assumed to be an ideal transformer, no pulse voltage corresponding to the flyback pulse is generated at the center point of the secondary winding 32; that is, this center point becomes a neutral point for the alternating current and it assumes a DC potential which is just half the value of the high DC voltage.

Pulse voltages whose amplitudes are one half of that of the usual high AC voltage and opposite in polarity to each other are produced at couplers 33 and 36 provided at the upper and lower ends of the secondary winding 32. Consequently, in this circuit arrangement the secondary winding 32 functions as if it were substantially divided into two parts each having ½ $n_2$ turns and connected in series with each other. As a result, in the equivalent circuit shown in FIG. 3b, while an inductance 31L and capacitance 31C on the primary side and a leakage inductance 32L transferred to the primary side are the same as in the prior art devices, the value $C'_2$ of the secondary side capacitance 32C' transferred to the primary side will be given, assuming that the same secondary side capacitance $C_o$ as in the prior art devices is concentrated on the coupler 33 and 36 respectively, as $C'_2 = (\frac{1}{2}n_2/n_1)^2 C_o + (\frac{1}{2}n_2/n_1)^2 C_o = \frac{1}{2}(n_2/n_1)^2 C_o$, which indicates that the value is one half of that heretofore obtainable. Since the secondary side capacitance value $C'_2$ can be substantially reduced in this way, it is possible to reduce the pulse width of the high AC voltage induced in the secondary winding 32 of the transformer 3 and hence a high AC voltage having a higher amplitude than heretofore obtained may be generated to thereby produce a higher DC voltage.

This permits the use of a cathode ray tube having a greater diameter and thus requiring a higher DC voltage. Further, since the capacitance $C'_2$ on the secondary side can be reduced substantially, the tuning to a higher harmonic of the inductance 32L and capacitance 32C' on the secondary side can be readily effected and hence a highly efficient high voltage generator can be provided. Furthermore, since, in this arrangement, the amplitude of the AC voltage, i.e., the pulse induced in the secondary winding 32 is one half of that heretofore obtained and since this pulse voltage is practically superimposed on the DC voltage at the neutral point, the insulation between the secondary winding 32 and the core or the ground for the alternating current can be considerably simplified as compared with that heretofore required. In other words, the insulation for the alternating current would be sufficient if it is designed to withstand the voltage which is about one half of that in the prior art devices. With respect to the direct current, however, the secondary winding 32 as a whole has always a potential higher than the usual one by one half the value of the higher DC voltage, but this is not a problem as compared with the insulation for the alternating current since the insulation for the direct current is very simple. In addition, since the value of the voltage applied across each of the rectifiers 41 and 42 is reduced to about one half, those rectifiers which have lower withstanding voltages may be used.

Figure 3C:
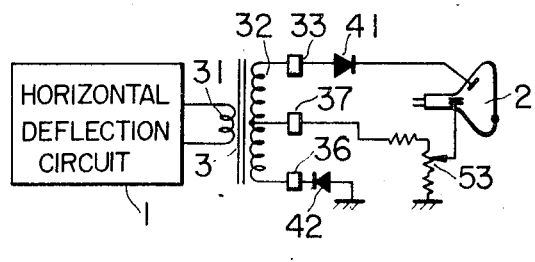

Further, in view of the fact that the voltage at the neutral point is a moderately high DC voltage, as shown in FIG. 3c, a center tap 37 may be provided at this neutral point having the moderately high DC voltage to thereby very easily provide without using any rectifier the required moderately high DC voltage which will be suitably divided by a resistor 53 and supplied to the focusing electrode of the cathode ray tube 2.

Figure 4A:
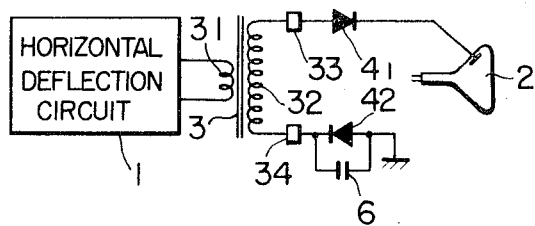
FIGS. 4a and 4b are circuit diagrams of the high voltage generator according to another embodiment of the present invention.
Figure 4B:
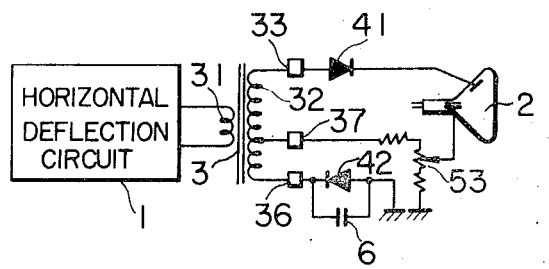

FIG. 4 illustrates the high voltage generator according to another embodiment of the invention. In this embodiment, a capacitor 6 is connected in parallel with the rectifier 42. With this arrangement, the capacitance value of the capacitor 6 may be changed to change the capacitance value on the side of the secondary winding 32, so that the pulse width of the high AC voltage induced in the secondary winding 32 is changed and consequently the magnitude of the high DC voltage obtained by changing the pulse amplitude of the high AC voltage may be adjusted. Further, by similarly changing the capacitance value on the secondary side to adjust the tuning frequency of the higher order of harmonics, the optimum condition is secured to operate the device and thus ensure an improved efficiency. Furthermore, since the capacitance value of the capacitor 6 can be changed to change the magnitude of the DC voltage superimposed in the secondary winding 32 and since the position of the neutral point can be changed and also the magnitude of the moderately high DC voltage appearing at this neutral point can be changed, if the tap 37 is provided at the neutral point to produce the moderately high DC voltage for the focusing electrode of the cathode ray tube 2 as shown in FIG. 4b, the moderately high DC voltage of any desired magnitude may be selected independently of the magnitude of the high DC voltage for the anode of the cathode ray tube 2. Accordingly, in contrast to prior art devices wherein an unnecessarily high voltage is divided, the insulation of the wires, etc. can be simplified and moreover the focusing voltage can be adjusted easily.

Figure 5:
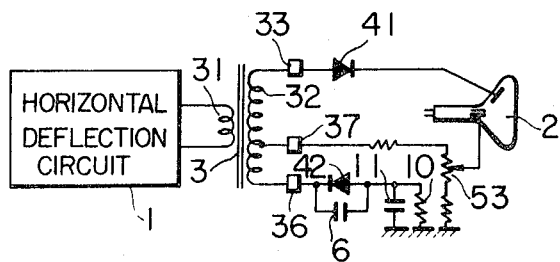
FIG. 5 is a circuit diagram of the high voltage generator according to still another embodiment of the present invention.

FIG. 5 illustrates still another embodiment of the present invention. In this embodiment, a resistor 10 is connected in series with the rectifier 42 and a capacitor 11 is connected in parallel with the resistor 10. With this arrangement, the moderately high DC voltage produced at the tap 37 may be changed in proportion to variations in the anode current for the cathode ray tube 2. In other words, the magnitude of the required high DC voltage for the focusing electrode of the cathode ray tube 2 differs depending on whether the picture is weak, i.e., the anode current is low or the picture is bright, i.e., the anode current is high. When the picture is bright, i.e., the anode current is high, the moderately high DC voltage of a smaller magnitude is required for the focusing electrode. Therefore, in the arrangement shown in FIG. 5, a voltage drop is developed across the resistor 10 which is proportional to the magnitude of the anode current, thereby meeting the above-mentioned requirements. In this embodiment, the capacitor 11 is provided to bypass the alternating component.

Figure 6A:
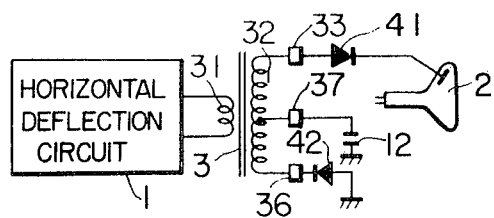
FIGS. 6a and 6b are circuit diagrams of the high voltage generator according to yet another embodiment of the present invention.
Figure 6B:
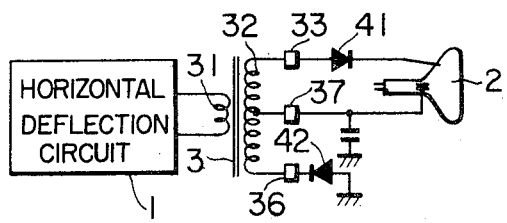

While, in the embodiments of this invention so far described, use is made of the neutral point for the alternating current which is unartificially formed on the secondary winding 32 of the flyback transformer 3 by the moderately high DC voltage superimposed in the secondary winding 32, there is possibility in these arrangements that the position of the neutral point may be changed due to a change in the surrounding conditions of the secondary winding 32 or a change in the operating conditions, thereby ruining the stable operation of the device. To solve this problem the embodiment shown in FIGS. 6a and 6b shows an arrangement wherein the neutral point is forcedly determined. Also in this arrangement, the secondary winding is completely divided for the alternating current to thereby improve the efficiency of the high voltage generator. In this embodiment, a capacitor 12 having a sufficiently low impendance for the AC signal used in this embodiment is provided between the tap 37 arbitrarily provided on the secondary winding 32 and the ground, whereby the tap 37 is forcedly caused to act as the neutral point for the alternating current. In this case, the values of the AC voltages at the couplers 33 and 36 correspond to those obtained by dividing the value of the AC voltage induced in the entire secondary winding 32 according to the dividing ratio of the total number of turns in the secondary winding 32 by the tap 37, and these AC voltages are opposite in polarity with respect to each other. Consequently, the capacitor 12 forcedly divides the secondary winding 32 into two parts for the alternating current. Here, each of the two portions of the secondary winding 32 may be tuned to a separate frequency. In other words, that portion of the secondary winding 32 between the coupler 33 and the tap 37 may be tuned to the third harmonic frequency, while the other portion of the secondary winding 32 between the tap 37 and the coupler 36 may be tuned to the fifth harmonic frequency. Such adjustment of harmonic frequency may be easily accomplished by suitably changing the position of the tap 37, the capacitance, e.g., the stray capacitance on the side of the coupler 33, the winding method of the respective two portions of the secondary windings 32 and so on. It has been found from the consideration of the waveshape of high AC voltage induced in the secondary winding 32 that if the two portions of the secondary winding 32 are tuned to two separate higher order harmonic frequencies, a waveshape having the most flat leading portion may be obtained when one of the two secondary winding portions is tuned to $(2n + 1)$th frequency and the other portion is tuned to $(2n + 3)$th frequency ($n$ is a positive integer). In other words, the impedance of the high voltage generator is reduced and thus the high voltage generator can operate with a highly improved stability. Accordingly, the high voltage generator according to this embodiment has excellent characteristics.

Further, in view of the fact that the potential at the neutral point forcedly formed as shown in FIG. 6b is a DC potential, i.e., a moderately high DC voltage, this moderately high DC voltage may be very conveniently utilized to provide the required moderately high DC voltage for the focusing electrode without using any rectifier. In addition, the value of this moderately high DC voltage may be changed as desired by changing the position of the tap 37.

Figure 7:
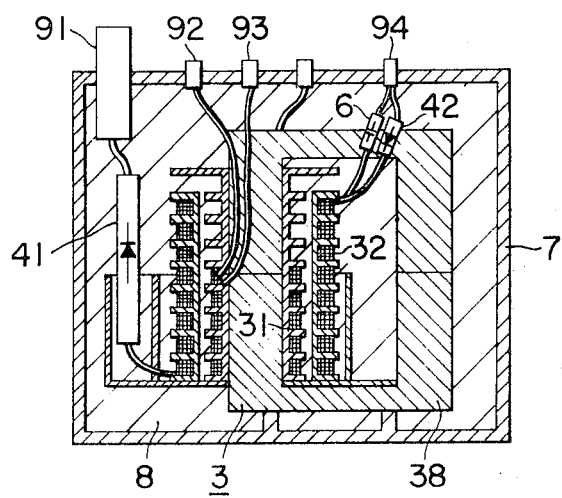
FIG. 7 is a sectional view of the high voltage generator according to still another embodiment of the present invention.

In the embodiements shown in FIGS. 3 through 6, the voltage generated at the cathode of the rectifier 42, i.e., the moderately high DC voltage is superimposed in the entire secondary winding 32 and consequently the secondary winding 32 is always maintained at a potential which is considerably high with respect to the ground. Therefore, if a fine conductor of the order of 0.1 mm $\phi$ is used for the secondary winding 32, there is a danger of the secondary winding 32 breaking down due to electrolytic corrosion when the moisture in the air attaches to the secondary winding 32. To prevent this danger, as shown in FIG. 7, a core 38, primary winding 31 and secondary winding 32 of the flyback transformer 3 may be placed in a sealed case 7 and then a filling oil 8 such as silicon oil having excellent insulating property and high frequency characteric may be filled in the space within the case, thereby solving the problem. In this case, the rectifiers 41 and 42 may be concurrently housed conveniently in the case 7, thereby eliminating the circuit lead in. Further, in FIG. 7 numerals 91, 92, 93 and 94 designate connecting terminal strips for connection with external circuits and so on.

What we claim is:

1. A high voltage generator comprising a transformer having a secondary winding, a first rectifier having one end thereof connected to one end of said secondary winding and the other end thereof connected to a reference potential point, said first rectifier being provided to float the secondary winding of said transformer from the reference potential point, and a second rectifier having the same polarity as that of said first rectifier with respect to DC current flowing through the secondary winding of said transformer, said second rectifier having one end thereof connected to the other end of said secondary winding and the other end thereof being an output terminal for a load.

2. A high voltage generator according to claim 1, wherein said transformer is housed in a case filled with an insulating liquid.

3. A high voltage generator according to claim 1, wherein said transformer is a flyback transformer and wherein an output terminal for moderately high DC voltage is provided at a neutral point for alternating current produced in the secondary winding of said flyback transformer, said neutral point being defined as a point at which no pulse potential corresponding to a flyback pulse is generated and pulse voltages are induced between the neutral point and one end of said secondary winding and between the neutral point and the other end of said secondary winding respectively, said pulse voltages having reverse polarity with respect to each other.

4. A high voltage generator according to claim 1 further including a capacitor connected in parallel with said first rectifier connected to said reference potential point.

5. A high voltage generator according to claim 4, wherein said transformer is a flyback transformer and wherein an output terminal for moderately high DC voltage is provided at a neutral point for alternating current in said secondary winding, said neutral point being shifted by varying the capacitance value of said capacitor, said neutral point being defined as a point at which no pulse potential corresponding to a flyback pulse is generated and pulse voltages are induced between the neutral point and one end of said secondary winding and between the neutral point and the other end of said secondary winding respectively, said pulse voltages having reverse polarity with respect to each other.

6. A high voltage generator comprising a flyback transformer having a secondary winding, a first rectifier having one end thereof connected to one end of said secondary winding and the other end thereof connected to a reference potential point, a second rectifier having the same polarity as that of said first rectifier, said second rectifier having one end thereof connected to the other end of said secondary winding, the other end thereof being an output terminal for a load, and a capacitor connected between a given division point in said secondary winding and a given reference potential point, said division point being rendered forcibly to be a neutral point for alternating current by said capacitor at which point no pulse potential corresponding to a flyback pulse is generated and pulse voltages are induced between the neutral point and one end of said secondary winding and between the neutral point and the other end of said secondary winding respectively, said pulse voltages having reverse polarity with respect to each other.

7. A high voltage generator according to claim 6, wherein tuning to two different odd order harmonic frequencies of a driving AC voltage is effected by a primary winding of said transformer and said secondary winding divided by said capacitor.

8. A high voltage generator according to claim 6, wherein an output terminal for moderately high DC output is provided at the junction point between said secondary winding and said capacitor.

9. A high voltage generator comprising a flyback transformer connected to a horizontal output circuit, a first rectifier having one end thereof connected to one end of a secondary winding of said flyback transformer and the other end thereof connected to a reference potential point, a second rectifier having the same polarity as that of said first rectifier with respect to DC current flowing through the secondary winding of said transformer, said second rectifier having one end thereof connected to the other end of said secondary winding and the other end thereof connected to an anode electrode of a cathode ray tube, and an output terminal for moderately high DC voltage provided at a neutral point for alternating current formed in said secondary winding of said flyback transformer, said neutral point being defined as a point at which no pulse potential corresponding to a flyback pulse is generated and pulse voltages are induced between the neutral point and one end of said secondary winding and between the neutral point and the other end of said secondary winding respectively, said pulse voltages having reverse polarity with respect to each other, and output terminal being connected to a focusing electrode of said cathode ray tube.

* * * * *